(12) United States Patent
Sperle et al.

(10) Patent No.: US 9,037,582 B2
(45) Date of Patent: May 19, 2015

(54) FLEXIBLE HIERARCHY OF GROUPING QUALIFICATIONS

(75) Inventors: Robin Sperle, Mannheim (DE); Heinz Schillinger, Sinsheim (DE); Mathias Schoenecker, Hambrucken (DE)

(73) Assignee: SAP SE, Walldorf (DE)

( * ) Notice: Subject to any disclaimer, the term of this patent is extended or adjusted under 35 U.S.C. 154(b) by 1248 days.

(21) Appl. No.: 11/284,263

(22) Filed: Nov. 21, 2005

(65) Prior Publication Data

US 2007/0118522 A1    May 24, 2007

(51) Int. Cl.
    *G06F 17/30*      (2006.01)
    *G06Q 10/10*      (2012.01)
    *G06Q 10/06*      (2012.01)

(52) U.S. Cl.
    CPC ........ *G06Q 10/10* (2013.01); *G06Q 10/063112* (2013.01); *Y10S 707/947* (2013.01)

(58) Field of Classification Search
    USPC .......... 707/794, 947, 780, 796; 705/321, 320
    See application file for complete search history.

(56) References Cited

U.S. PATENT DOCUMENTS

| | | | |
|---|---|---|---|
| 6,029,195 A | 2/2000 | Herz | |
| 6,275,812 B1 | 8/2001 | Haq et al. | |
| 6,289,340 B1 * | 9/2001 | Puram et al. | 707/5 |
| 6,385,620 B1 * | 5/2002 | Kurzius et al. | 707/104.1 |
| 6,484,190 B1 * | 11/2002 | Cordes et al. | 715/207 |
| 6,524,109 B1 * | 2/2003 | Lacy et al. | 434/219 |
| 6,618,723 B1 | 9/2003 | Smith | |
| 6,735,570 B1 * | 5/2004 | Lacy et al. | 705/7 |
| 7,054,821 B1 * | 5/2006 | Rosenthal et al. | 705/1 |
| 7,085,806 B1 | 8/2006 | Shapira | |
| 7,526,507 B2 * | 4/2009 | Holloway et al. | 1/1 |
| 7,555,441 B2 | 6/2009 | Crow et al. | |
| 7,706,523 B2 | 4/2010 | Agusta | |
| 2002/0069080 A1 * | 6/2002 | Roy et al. | 705/1 |
| 2003/0009437 A1 * | 1/2003 | Seiler et al. | 707/1 |
| 2003/0078821 A1 | 4/2003 | Gorur et al. | |
| 2003/0083891 A1 * | 5/2003 | Lang et al. | 705/1 |
| 2003/0125970 A1 | 7/2003 | Mittal et al. | |
| 2003/0139953 A1 | 7/2003 | Guenther et al. | |
| 2004/0030566 A1 * | 2/2004 | Brooks Rix | 705/1 |
| 2005/0004942 A1 * | 1/2005 | Madsen et al. | 707/104.1 |
| 2005/0055226 A1 * | 3/2005 | Dane et al. | 705/1 |
| 2005/0149376 A1 | 7/2005 | Guyan et al. | |
| 2005/0267934 A1 * | 12/2005 | Brown et al. | 709/203 |
| 2006/0111932 A1 * | 5/2006 | Brown et al. | 705/1 |
| 2006/0178896 A1 * | 8/2006 | Sproul | 705/1 |
| 2006/0229896 A1 | 10/2006 | Rosen et al. | |
| 2007/0203772 A1 | 8/2007 | Eun et al. | |

OTHER PUBLICATIONS ("Webster's Third New International Dictionary of the English Language Unabridged", 1966, G. & C. Merriam Co., p. 1944).*
Colucci et al. A Formal Approach to Ontology-Based Semantic Match of Skills Descriptions, 2003, Journal of Universal Computer Science, vol. 9, No. 12, pp. 1437-1454.*
U.S. Appl. No. 11/283,667, filed Nov. 21, 2005.
U.S. Appl. No. 11/283,668, filed Nov. 21, 2005.

* cited by examiner

*Primary Examiner* — James E Richardson
(74) *Attorney, Agent, or Firm* — Kenyon & Kenyon LLP

(57) ABSTRACT

A method for matching a first object of a first type with a second object of a second type includes reviving one or more qualifications blocks to be applied to the first object, determining a set of qualifications for each of the one or more qualifications blocks, applying each qualification of the sets of qualifications associated with each qualification block to the first object, and matching the first object to the second object based on the applied sets of qualifications.

15 Claims, 4 Drawing Sheets

FLEXIBLE HIERARCHY OF GROUPING QUALIFICATIONS

BACKGROUND

1. Technical Field

The present disclosure relates to grouping qualifications and, more specifically, flexible hierarchy of grouping qualifications.

2. Description of the Related Art

Human Capital Management (HCM) systems are computerized solutions used by enterprises to effectively manage pools of human capital. HCMs are commonly integrated into a broader suit of Enterprise Resource Planning (ERP) applications that integrate information from a diverse set of applications into a singular database. One prime example of an ERP solution is "mySAP" or "SAP R/3" offered by SAP.

One function of HCM systems is to match human capital, such as employees, with positions so as to make the best possible use of available resources. ERP solutions have traditionally relied on rigid rules to keep key data well managed. As ERPs have evolved, methods have been devised to expand ERP flexibility and thereby enhance user friendliness and customization without compromising effectiveness. However, there is a continuing need to add flexibility while preserving and/or enhancing ERP effectiveness.

SUMMARY

A method for matching a first object of a first type with a second object of a second type includes reviving one or more qualifications blocks to be applied to the first object, determining a set of qualifications for each of the one or more qualifications blocks, applying each qualification of the sets of qualifications associated with each qualification block to the first object, and matching the first object to the second object based on the applied sets of qualifications.

A method for matching a person represented by a person object within a database to a position represented by a position object within the database includes receiving one or more qualifications blocks to be applied to the person object, looking up each of the one or more qualifications blocks in a qualifications blocks catalogue to determine a set of qualifications associated with each qualifications block, applying each qualification of the sets of qualifications associated with each qualification block to the person object, and matching the person to the position by comparing the qualifications applied to the person object with one or more qualifications applied to the position object.

A system for matching a first object of a first type with a second object of a second type includes a retrieving unit for reviving one or more qualifications blocks to be applied to the first object, a determining unit for determining a set of qualifications for each of the one or more qualifications blocks, an applying unit for applying each qualification of the sets of qualifications associated with each qualification block to the first object, and a matching unit for matching the first object to the second object based on the applied sets of qualifications.

A system for matching a person represented by a person object within a database to a position represented by a position object within the database, includes a receiving unit for receiving one or more qualifications blocks to be applied to the person object, a looking-up unit for looking up each of the one or more qualifications blocks in a qualifications blocks catalogue to determine a set of qualifications associated with each qualifications block, an applying unit for applying each qualification of the sets of qualifications associated with each qualification block to the person object, and a matching unit for matching the person to the position by comparing the qualifications applied to the person object with one or more qualifications applied to the position object.

A computer system includes a processor and a program storage device readable by the computer system, embodying a program of instructions executable by the processor to perform method steps for matching a first object of a first type with a second object of a second type. The method includes reviving one or more qualifications blocks to be applied to the first object, determining a set of qualifications for each of the one or more qualifications blocks, applying each qualification of the sets of qualifications associated with each qualification block to the first object, and matching the first object to the second object based on the applied sets of qualifications.

A computer system includes a processor and a program storage device readable by the computer system, embodying a program of instructions executable by the processor to perform method steps for matching a person represented by a person object within a database to a position represented by a position object within the database. The method includes receiving one or more qualifications blocks to be applied to the person object, looking up each of the one or more qualifications blocks in a qualifications blocks catalogue to determine a set of qualifications associated with each qualifications block, applying each qualification of the sets of qualifications associated with each qualification block to the person object, and matching the person to the position by comparing the qualifications applied to the person object with one or more qualifications applied to the position object.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
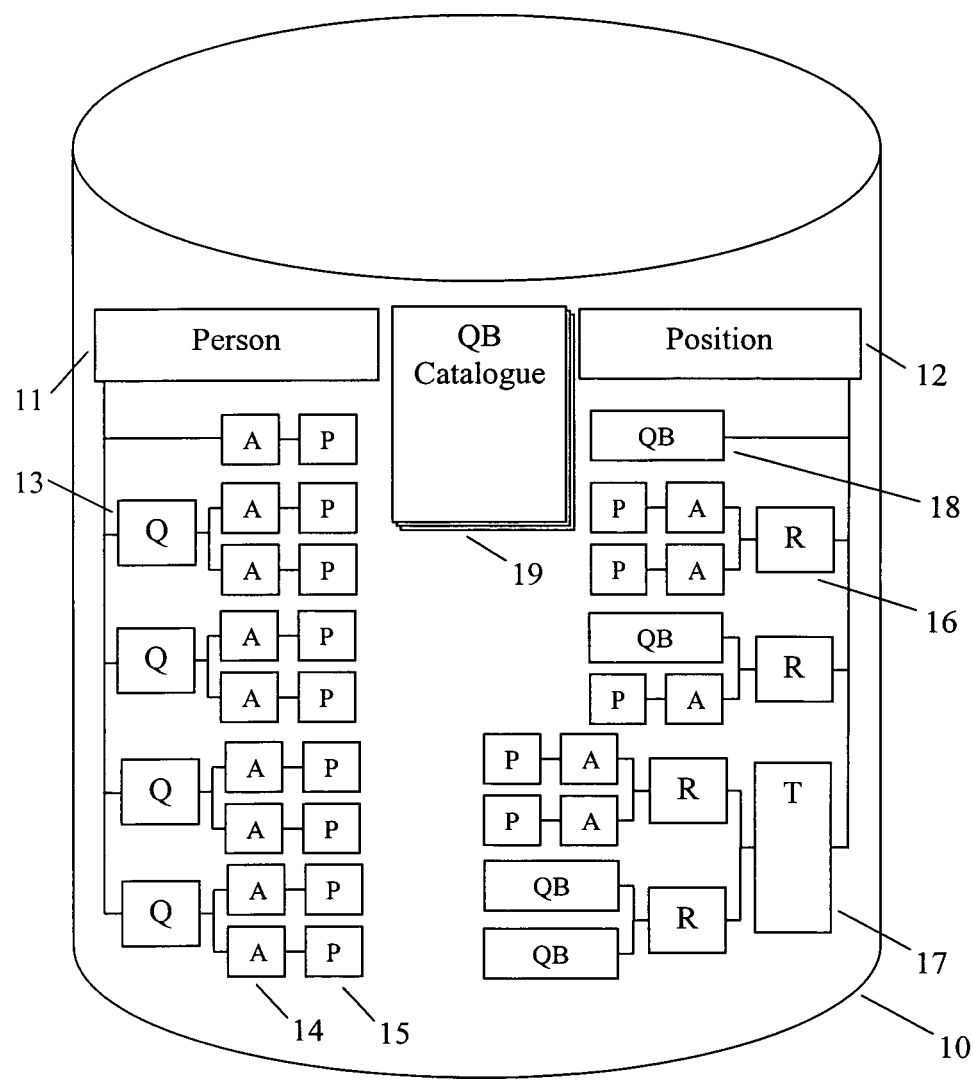
FIG. 1 shows a hierarchy diagram showing a database used to store information pertinent to both the human capital at the qualification side and the positions at the requirements side according to an embodiment of the present disclosure.

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

One important feature of the HCM is to match positions with human capital (people), such as employees. Human capital is described according to various qualifications and positions are described according to various requirements. Therefore, in matching human capital to positions, qualifications are compared against requirements.

A database may be used to store information pertinent to both the human capital at the qualification side and the positions at the requirements side. FIG. 1 shows a hierarchy diagram showing a database used to store information pertinent to both the human capital at the qualification side and the positions at the requirements side according to an embodiment of the present disclosure. The database 10 may be populated by one or more hierarchical objects. On the qualification side, each person, for example, an employee or other source of human capital, may be represented by a person object 11. The person object 11 may have one or more associated qualification objects 13. A qualification object 13 may represent a specific productive feature, for example, skills, for that person, for example, the ability to write computer programs. Each qualification object 13 may include attributes 14 and/or associated proficiencies 15. An attribute 14 may be a qualitative skill, such as fluency with C++. A proficiency 15 may be a quantitative assessment associated with a given attribute. For example, a number on the scale of 1 to 10 or a simple yes/no scale. For example, a given person object "John Smith" may have an associated qualification object comprising the attribute object "fluency with C++" and a proficiency object of "7". A proficiency may be a customization of an otherwise predefined grouping. For example, two people may share a qualification but have a different proficiency.

As discussed above, when populating the person object 11 with qualification objects 13, it may be convenient to use one or more qualification groups. Each qualification group may represent one or more qualification objects 13. Qualification groups may be used to facilitate data entry, organization and accuracy in programming the person objects 11. Qualification groups may be used to facilitate expression of sets of qualifications that commonly accompany one another. For example, there may be a "software design" qualification group that includes a set of attributes that are commonly associated with one who is capable of designing software.

Similarly, on the requirements side, each position may be represented by a position object 12. The position object 12 may have one or more associated requirement objects 16. Each requirement object 16 may represent a particular set of productive features, for example, skills, that are believed to be important for effectively filling the position. Each requirement object 16 may include attributes 14 and/or associated proficiencies 15.

A position object 12 may also have one or more associated task objects 17. Each task object 17 may include one or more requirement objects 16 that may together define a certain sort of responsibility that someone in the given position would have to fulfill. For example, a "software design manager" position object may include task objects such as "personnel management" and "software design." Each task object may then include one or more attributes and/or proficiencies. For example, the "personnel management" task may include a "leadership" attribute with an associated proficiency of 8 and an "organization" attribute with an associated proficiency of 7.

A job object is a generic definition of a position. One or more jobs may be used to more easily define a position object by potentially reducing the number of qualifications and tasks need not be explicitly applied to the position. To accomplish this, each job object may have one or more qualifications and/or tasks associated with it. When applied to a position object, the position object inherits the objects associated with the job objects.

In matching people to positions, a process called requirements analyzing may be executed. In requirements analyzing, the attributes and proficiencies of the various people are compared to the attributes and proficiencies of the various positions. For example, a "software engineer" position object with an associated requirement object with an associated attribute object "fluency with C++" and an associated proficiency object of "7" may be matched to a person object with an associated attribute object "fluency with C++" and an associated proficiency object of "7."

Dynamic Qualifications Blocks

Embodiments of the present disclosure may utilize dynamic qualifications blocks to facilitate the population person objects and/or to enhance the effectiveness of the ERP. A dynamic qualification block is a basket of qualification objects, for example, including attributes and/or associated proficiencies.

Qualification groups, as described above, may be used to define a qualification catalogue. The qualification catalogue may be used to define the composition of objects such as qualifications. Qualification groups may be used independent of objects, e.g., qualification groups may not be associated directly to an object.

Dynamic qualification blocks 18 differ from qualification groups in that qualification blocks can be assigned directly to objects, for example, position objects, job objects and/or task objects. Qualification blocks do not define qualifications as qualification groups do.

Figure 2:
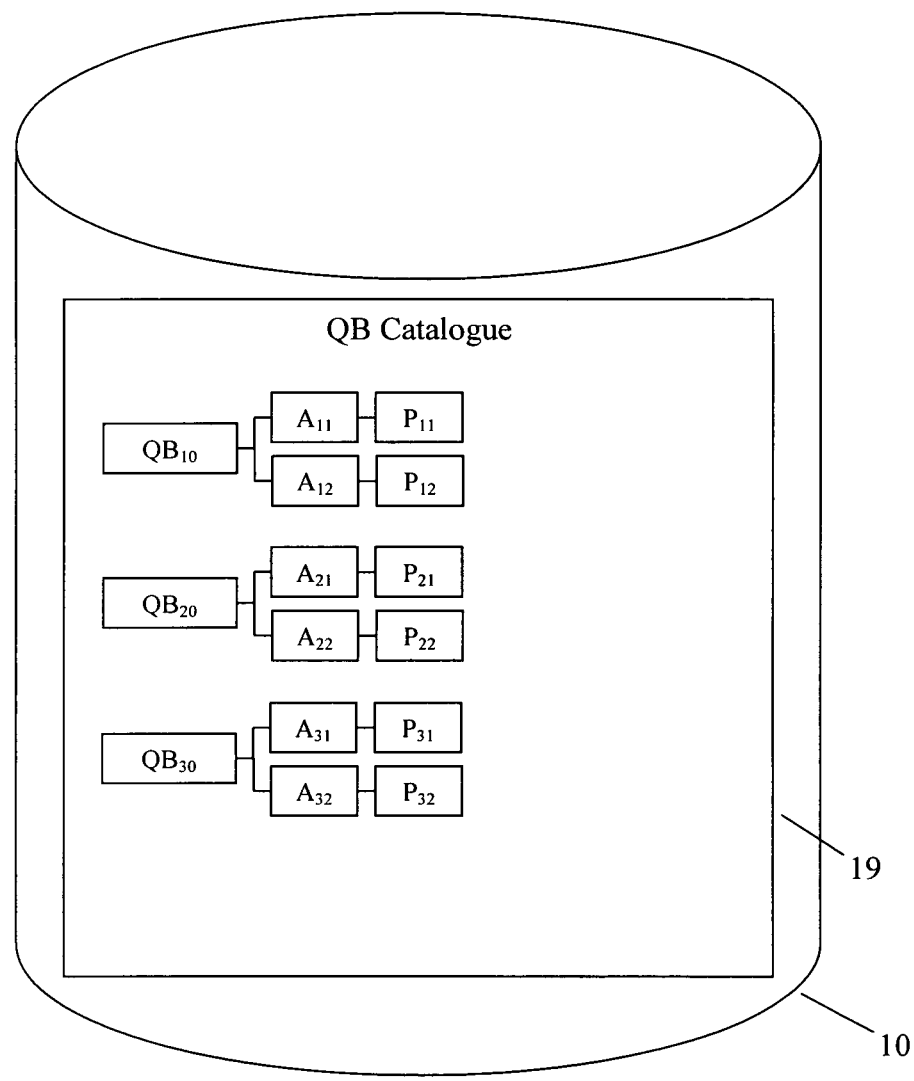
FIG. 2 shows the qualification block catalogue of FIG. 1 according to an embodiment of the present disclosure.

Qualification blocks may be assigned, for example on the requirements side, to positions, tasks and jobs. While dynamic qualification blocks may be assigned to an object, they need not be stored directly to the database in association with the person object. Definitions for dynamic qualification blocks may be stored in a qualification block catalogue that may be stored in the database. FIG. 2 shows the qualification block catalogue of FIG. 1 according to an embodiment of the present disclosure. When a dynamic qualification block 18 is associated with an object, for example a person object, only the qualification objects that are presently associated with the dynamic qualification block are stored to the database 20 in association with the person object. Therefore, if dynamic qualification blocks 18 are modified or deleted, the qualifications associated with each person object remain accurate without additional maintenance procedures.

The qualification block catalogue 19 may contain definitions of a plurality of qualification blocks (QB), for example, $QB_{10}$, $QB_{20}$ and $QB_{30}$. The definitions may indicate, for example, which attributes and qualifications are associated with each qualification block. For example, $QB_{10}$ may be defined as containing attribute $A_{11}$, proficiency $P_{11}$, attribute $A_{12}$ and proficiency $P_{12}$. $QB_{20}$ may be defined as containing attribute $A_{21}$, proficiency $P_{21}$, attribute $A_{22}$ and proficiency $P_{22}$. The other qualification blocks, for example, $QB_{20}$ and $QB_{30}$, may be similarly defined.

When a person object is displayed, the qualifications associated with that person may be analyzed according to the then existing dynamic qualification blocks and where appropriate, dynamic qualification blocks may be displayed in place of their constituent qualifications.

Embodiments of the present disclosure may also allow for partial qualification block fulfillment whereby when a person has some but not all qualifications necessary to make up a qualification block, that qualification block may be displayed or otherwise used along with an indication that the qualification block is partial. For example, a percentage indicating the degree to which the qualification block has been filled may be displayed.

Each qualification associated with the qualification blocks may have its own independent proficiencies. It is not required that proficiencies be applied to all qualifications associated with a qualifications block.

Requirements Analyzing

Requirements analyzing is the process of matching the requirements of a position with the qualifications of a person. Requirements analyzing traditionally utilizes a ridged approach where the hierarchy of the position object is rigidly compared to the hierarchy of the person object. As discussed above, the position object may have one or more associated tasks and each task may have one or more associated qualifications. Each qualification may then have an associated proficiency. Similarly, the person object may have one or more associated qualification groups or blocks, each with one or more associated qualifications. Each qualification may then have an associated proficiency.

Because the hierarchy of the position and the hierarchy of the person are rigidly compared in this hierarchical evaluation path, position tasks in their entirety are compared against person qualification blocks or groups in their entirety and unless the person has a group or block that exactly matches a task, a match is not made. Therefore, the traditional system suffers from the disadvantage that a person possessing all of the requisite qualifications to satisfy a particular position may not match to that position because the person's qualifications may be arranged in groups or blocks that do not exactly correspond to the tasks of the position.

Moreover, in the traditional system, proficiency levels are ignored as only the qualification groups or blocks are considered. Also, the traditional system relies on the hierarchies of position objects being commonly arranged as position objects having associated task objects having associated qualification objects. If a task object of a position object had one or more associated task objects each with associated qualification objects, then that position object could not be effectively matched using the hierarchical evaluation path.

Figure 3:
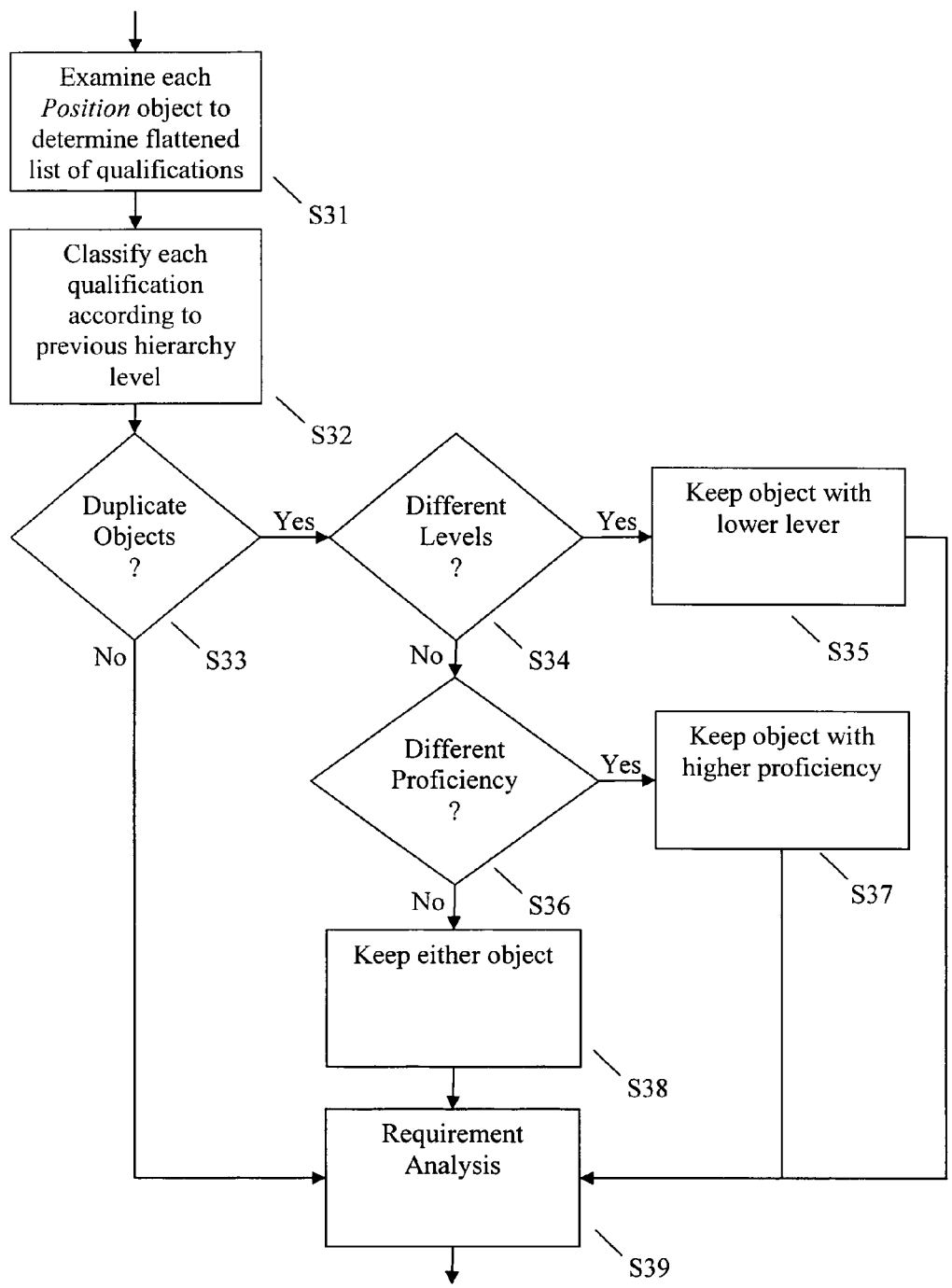
FIG. 3 is a flow chart showing a method for performing requirement analysis according to an embodiment of the present disclosure.

In embodiments of the present disclosure, a flexible and customizable evaluation path is used. FIG. 3 is a flow chart showing a method for performing requirement analysis according to an embodiment of the present disclosure. Each position object is examined to determine a flat list of all qualifications regardless of where they appear in the hierarchy (Step S31). The requirements may then be classified by their relative hierarchy level from the root object (Step S32). For example, if a qualification is directly associated with a position then it is given a classification of "1." Whereas, if a qualification is within a task which is within a task which is within the position, then the qualification is given a classification of "3." Under this approach, the lower the classification number, the closer the qualification is to the root.

In analyzing the position object, certain qualifications may appear more than once (Step S33). In these cases (Yes, Step S33), it may be determined whether the similar objects have different classification numbers (Step S34). If they do (Yes, Step S34) then the qualification with the lesser classification number remains and the others are not considered (Step S35) then the requirement analysis may continue using the flattened list of qualifications (Step S39). If there are no duplicate objects (No, Step S33) then the requirement analysis may continue using the flattened list of qualifications (Step S39).

However, if there are duplicate objects (Yes, Step S33) and the levels are not different (No, Step S34) then it may be determined whether there is a difference in the proficiency levels associated with the duplicate objects (Step S36). If there are differences in the proficiency levels associated with the duplicate objects (Yes, Step S36) then the object with the highest proficiency is kept and the rest are discarded (Step S37) then the requirement analysis may continue using the flattened list of qualifications (Step S39). However, if there are no differences in the proficiency levels (No, Step S36) then the objects are functionally identical and one may be kept and the others discarded (Step S38) then the requirement analysis may continue using the flattened list of qualifications (Step S39).

When performing requirements analyzing, the qualifications of the position may be compared directly to the qualifications of the person. Qualifications will not fail to match simply because the hierarchies may differ. The classification numbers and the proficiency values of the qualifications may then factor into determining the relative strength of a match between person and position according to a predetermined weight.

Where no single person object contains qualifications matches for all of the qualifications associated with the position object, a most-capable person object may be determined, for example, by comparing sub-groupings such as qualifications blocks and/or tasks.

Embodiments of the present disclosure also allow for greater freedom in defining the position object. For example, a position object may have associated tasks which may themselves have associated tasks. It may also be possible for a task to have an associated position.

Figure 4:
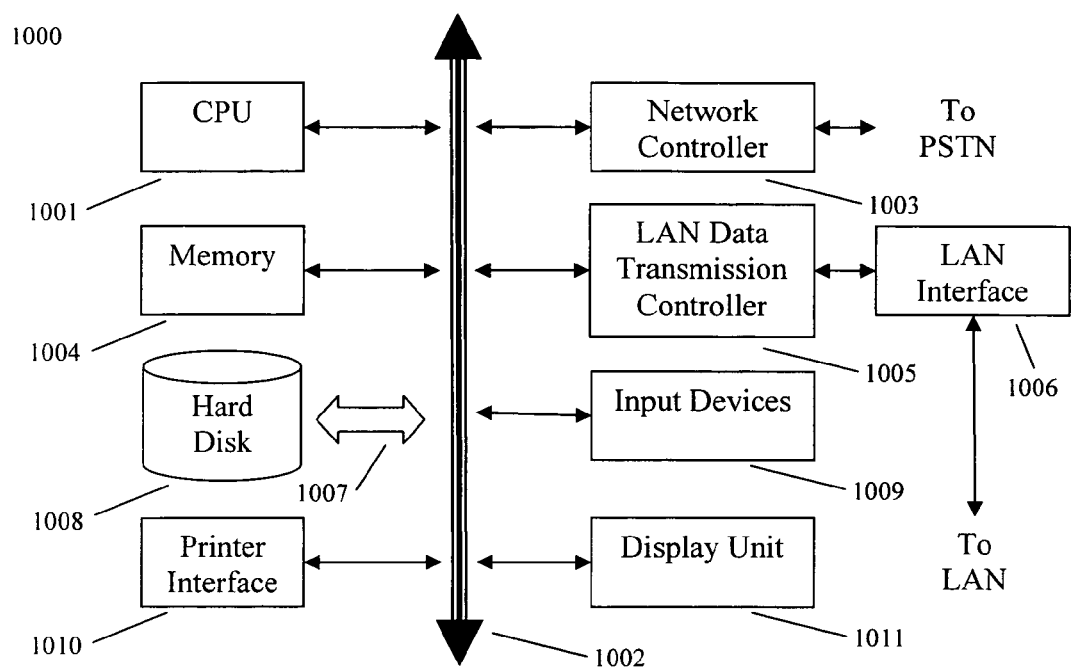
FIG. 4 shows an example of a computer system capable of implementing the method and apparatus according to embodiments of the present disclosure.

FIG. 4 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A computer implemented method for matching a first object of a first type with a second object of a second type by a computer processor, comprising:

providing the first object in a database, wherein the first object includes a hierarchical data structure including a plurality of qualification data objects;

creating, in the database, a qualification block catalogue containing definitions of a plurality of qualifications blocks, each qualifications block including a set of qualification data objects that specify the qualification block, wherein the qualification block catalogue is separate from the first object;

comparing the hierarchical data structure of the first object against the plurality of qualifications blocks stored in the database;

displaying the first object such that:

if a qualification block matches a portion of the hierarchical data structure of the first object, a visual representation of the matched qualification block replaces the portion of the hierarchical data structure of the first object in the display and the matched qualification block is linked to the qualification block catalogue in the database; and if a qualification block partially matches a portion of the hierarchical data structure of the first object, a visual representation of the partially-matched qualification block replaces the portion of the hierarchical data structure of the first object in the display along with an indicator of partial match and the displayed qualification block is linked to the qualification block catalogue in the database; and matching the first object to the second object based on the set of qualifications associated with at least one qualifications block.

2. The computer implemented method of claim 1, wherein the first object of the first type is a person object representing a person and the second object of the second type is a position object representing a position.

3. The computer implemented method of claim 1, wherein the set of qualifications for the at least one qualifications block may be determined by referencing the catalogue of qualifications blocks.

4. The computer implemented method of claim 1, wherein the step of matching the first object to the second object based on the applied sets of qualifications comprises matching qualifications including the set of qualifications associated with the qualifications block associated with the first object with one or more requirements applied to second object.

5. A computer implemented method for matching a person represented by a person object within a database to a position represented by a position object within the database by a computer processor, comprising:

providing a person object in a database, wherein the person object includes a hierarchical data structure including a plurality of qualification data objects;

creating, in the database, a qualification block catalogue containing definitions of a plurality of qualifications blocks, each qualifications block including a set of qualification data objects that specify the qualification block, wherein the qualification block catalogue is separate from the person object;

comparing the hierarchical data structure of the person object against the plurality of qualifications blocks stored in the database;

displaying the person object such that:

if a qualification block matches a portion of the hierarchical data structure of the person object, a visual representation of the matched qualification block replaces the portion of the hierarchical data structure of the person object in the display and the matched qualification block is linked to the qualification block catalogue in the database; and if a qualification block partially matches a portion of the hierarchical data structure of the person object, a visual representation of the partially-matched qualification block replaces the portion of the hierarchical data structure of the person object in the display along with an indicator of partial match and the displayed qualification block is linked to the qualification block catalogue in the database; and matching the person object to the position object by comparing the set of qualifications associated with at least one qualifications block with one or more qualifications applied to the position object.

6. A computer system for matching a first object of a first type with a second object of a second type, comprising:

a processor for processing computer executable code, and
a computer readable recording medium, comprising computer executable code for:

providing the first object in a database, wherein the first object includes a hierarchical data structure including a plurality of qualification data objects;

creating, in the database, a qualification block catalogue containing definitions of a plurality of qualifications blocks, each qualifications block including a set of qualification data objects that specify the qualification block, wherein the qualification block catalogue is separate from the first object;

comparing the hierarchical data structure of the first object against the plurality of qualifications blocks stored in the database;

displaying the first object such that:

if a qualification block matches a portion of the hierarchical data structure of the first object, a visual representation of the matched qualification block replaces the portion of the hierarchical data structure of the first object in the display and the matched qualification block is linked to the qualification block catalogue in the database; and if a qualification block partially matches a portion of the hierarchical data structure of the first object, a visual representation of the partially-matched qualification block replaces the portion of the hierarchical data structure of the first object in the display along with an indicator of partial match and the displayed qualification block is linked to the qualification block catalogue in the database; and matching the first object to the second object based on the set of qualifications associated with at least one qualifications block.

7. The computer system of claim 6, wherein the first object of the first type is a person object representing a person and the second object of the second type is a position object representing a position.

8. The computer system of claim 6, wherein the set of qualifications for the at least one qualifications block may be determined by referencing the catalogue of qualifications blocks.

9. The computer system of claim 6, wherein the matching unit matches qualifications including the set of qualifications associated with the qualifications block associated with the first object with one or more requirements applied to second object.

10. A computer system for matching a person represented by a person object within a database to a position represented by a position object within the database, comprising:

a processor for processing computer executable code, and
a computer readable recording medium, comprising computer executable code for:

providing a person object in a database, wherein the person object includes a hierarchical data structure including a plurality of qualification data objects;

creating, in the database, a qualification block catalogue containing definitions of a plurality of qualifications blocks, each qualifications block including a set of qualification data objects that specify the qualification block, wherein the qualification block catalogue is separate from the person object;

comparing the hierarchical data structure of the person object against the plurality of qualifications blocks stored in the database;

displaying the person object such that:
if a qualification block matches a portion of the hierarchical data structure of the person object, a visual representation of the matched qualification block replaces the portion of the hierarchical data structure of the person object in the display and the matched qualification block is linked to the qualification block catalogue in the database; and if a qualification block partially matches a portion of the hierarchical data structure of the person object, a visual representation of the partially-matched qualification block replaces the portion of the hierarchical data structure of the person object in the display along with an indicator of partial match and the displayed qualification block is linked to the qualification block catalogue in the database; and matching the person object to the position object by comparing the set of qualifications associated with at least one qualifications block with one or more qualifications applied to the position object.

11. A computer system comprising: a processor; and
a program storage device readable by the computer system, embodying a program of instructions executable by the processor to perform method steps for matching a first object of a first type with a second object of a second type, the method steps comprising:

providing the first object in a database, wherein the first object includes a hierarchical data structure including a plurality of qualification data objects;

creating, in the database, a qualification block catalogue containing definitions of a plurality of qualifications blocks, each qualifications block including a set of qualification data objects that specify the qualification block, wherein the qualification block catalogue is separate from the first object;

comparing the hierarchical data structure of the first object against the plurality of qualifications blocks stored in the database;

displaying the first object such that:
if a qualification block matches a portion of the hierarchical data structure of the first object, a visual representation of the matched qualification block replaces the portion of the hierarchical data structure of the first object in the display and the matched qualification block is linked to the qualification block catalogue in the database; and if a qualification block partially matches a portion of the hierarchical data structure of the first object, a visual representation of the partially-matched qualification block replaces the portion of the hierarchical data structure of the first object in the display along with an indicator of partial match and the displayed qualification block is linked to the qualification block catalogue in the database; and matching the first object to the second object based on the set of qualifications associated with at least one qualifications block.

12. The computer system of claim 11, wherein the first object of the first type is a person object representing a person and the second object of the second type is a position object representing a position.

13. The computer system of claim 11, wherein the set of qualifications for the at least one qualifications block may be determined by referencing the catalogue of qualifications blocks.

14. The computer system of claim 11, wherein the step of matching the first object to the second object based on the applied sets of qualifications comprises matching qualifications including the set of qualifications associated with the qualifications block associated with the first object with one or more requirements applied to second object.

15. A computer system comprising: a processor; and
a program storage device readable by the computer system, embodying a program of instructions executable by the processor to perform method steps for matching a person represented by a person object within a database to a position represented by a position object within the database, the method steps comprising:

providing a person object in a database, wherein the person object includes a hierarchical data structure including a plurality of qualification data objects;

creating, in the database, a qualification block catalogue containing definitions of a plurality of qualifications blocks, each qualifications block including a set of qualification data objects that specify the qualification block, wherein the qualification block catalogue is separate from the person object;

comparing the hierarchical data structure of the person object against the plurality of qualifications blocks stored in the database;

displaying the person object such that:
if a qualification block matches a portion of the hierarchical data structure of the person object, a visual representation of the matched qualification block replaces the portion of the hierarchical data structure of the person object in the display and the matched qualification block is linked to the qualification block catalogue in the database; and if a qualification block partially matches a portion of the hierarchical data structure of the person object, a visual representation of the partially-matched qualification block replaces the portion of the hierarchical data structure of the person object in the display along with an indicator of partial match and the displayed qualification block is linked to the qualification block catalogue in the database; and matching the person object to the position object by comparing the set of qualifications associated with at least one qualifications block with one or more qualifications applied to the position object.

* * * * *